(12) United States Patent
Morita

(10) Patent No.: US 8,892,286 B2
(45) Date of Patent: Nov. 18, 2014

(54) HYBRID VEHICLE

(75) Inventor: Takeo Morita, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 261 days.

(21) Appl. No.: 13/639,733

(22) PCT Filed: Apr. 14, 2010

(86) PCT No.: PCT/JP2010/056637
§ 371 (c)(1),
(2), (4) Date: Oct. 5, 2012

(87) PCT Pub. No.: WO2011/128986
PCT Pub. Date: Oct. 20, 2011

(65) Prior Publication Data
US 2013/0030635 A1 Jan. 31, 2013

(51) Int. Cl.
*B60L 9/00* (2006.01)
*B60L 11/00* (2006.01)
*G05D 1/00* (2006.01)
*G05D 3/00* (2006.01)
*G06F 7/00* (2006.01)
*G06F 17/00* (2006.01)
*B60K 6/445* (2007.10)
*B60W 10/06* (2006.01)
*B60W 10/08* (2006.01)
*B60W 10/26* (2006.01)
*B60W 20/00* (2006.01)

(52) U.S. Cl.
CPC .............. *B60K 6/445* (2013.01); *B60W 10/06* (2013.01); *B60W 10/08* (2013.01); *B60W 10/26* (2013.01); *B60W 20/00* (2013.01); *B60W 2510/244* (2013.01); *B60W 2510/246* (2013.01); *Y02T 10/6239* (2013.01); *Y02T 10/6286* (2013.01); *Y02T 10/6269* (2013.01); *Y10S 903/903* (2013.01)
USPC .......................... 701/22; 180/65.25; 903/903

(58) Field of Classification Search
USPC .......... 701/22, 31.4, 102, 53, 55, 101, 51, 36, 701/110, 64; 180/65.25, 65.21, 65.1, 65.26, 180/2.2, 242, 233, 65.28, 65.7, 410, 68.5, 180/446, 303, 165, 304, 68.1, 65.29; 903/903, 902; 340/438; 477/3
See application file for complete search history.

(56) References Cited

U.S. PATENT DOCUMENTS 6,163,135 A 12/2000 Nakayama et al.
7,176,912 B2 * 2/2007 Kota et al. .................... 345/211
(Continued)

FOREIGN PATENT DOCUMENTS

AU 2003210038 A1 * 2/2004
JP A-2000-92614 3/2000
(Continued)

*Primary Examiner* — Thomas G Black
*Assistant Examiner* — Robert Payne
(74) *Attorney, Agent, or Firm* — Oliff PLC

(57) ABSTRACT

If it is determined that switching from a CD mode to a CS mode is requested by a running mode switching request switch, an ECU determines whether or not SOC of a power storage device is higher than a threshold value. If SOC is determined to be higher than the threshold value, ECU further determines whether or not temperature of the power storage device is lower than a threshold value. If SOC is determined to be higher than the threshold value and the temperature is determined to be lower than the threshold value, the ECU denies the request for switching from the CD mode to the CS mode, and maintains the CD mode as the running mode.

16 Claims, 7 Drawing Sheets

(56) References Cited

U.S. PATENT DOCUMENTS

| | | | |
|---|---|---|---|
| 7,242,146 B2 * | 7/2007 | Sung et al. | 315/169.3 |
| 7,420,551 B2 * | 9/2008 | Kota et al. | 345/211 |
| 7,424,361 B2 * | 9/2008 | Masuda et al. | 701/101 |
| 7,610,981 B2 * | 11/2009 | Banno et al. | 180/233 |
| 8,306,681 B2 * | 11/2012 | Soma | 701/22 |
| 8,352,150 B2 * | 1/2013 | Hijikata | 701/102 |
| 8,353,366 B2 * | 1/2013 | Tibbitts et al. | 175/54 |
| 8,353,367 B2 * | 1/2013 | Tibbitts et al. | 175/54 |
| 8,428,803 B2 * | 4/2013 | Komatsu et al. | 701/22 |
| 8,467,930 B2 * | 6/2013 | Kimura et al. | 701/31.4 |
| 8,712,619 B2 * | 4/2014 | Kusumi et al. | 701/22 |
| 2002/0044782 A1 * | 4/2002 | Kota et al. | 396/661 |
| 2005/0057462 A1 * | 3/2005 | Kota et al. | 345/76 |
| 2006/0152455 A1 * | 7/2006 | Sung et al. | 345/82 |
| 2008/0115997 A1 * | 5/2008 | Banno et al. | 180/242 |
| 2009/0288896 A1 | 11/2009 | Ichikawa | |
| 2009/0322503 A1 * | 12/2009 | Suzuki et al. | 340/438 |
| 2010/0030413 A1 | 2/2010 | Jinno | |
| 2010/0145560 A1 | 6/2010 | Komatsu et al. | |
| 2010/0163390 A1 * | 7/2010 | Wang et al. | 200/502 |
| 2010/0211254 A1 * | 8/2010 | Kimura et al. | 701/29 |
| 2012/0205155 A1 * | 8/2012 | Tibbitts et al. | 175/54 |
| 2012/0205156 A1 * | 8/2012 | Tibbitts et al. | 175/54 |

FOREIGN PATENT DOCUMENTS

| | | |
|---|---|---|
| JP | A-2008-49877 | 3/2008 |
| JP | A-2008-114791 | 5/2008 |
| JP | A-2008-201262 | 9/2008 |
| JP | A-2008-247318 | 10/2008 |
| JP | A-2009-18713 | 1/2009 |
| JP | A-2009-143563 | 7/2009 |
| JP | A-2009-214588 | 9/2009 |
| JP | A-2009-220765 | 10/2009 |
| JP | A-2010-70030 | 4/2010 |
| WO | WO 2008/023245 A2 | 2/2008 |

* cited by examiner

HYBRID VEHICLE

TECHNICAL FIELD

The present invention relates to a hybrid vehicle and, more specifically, to a hybrid vehicle including an internal combustion engine and an electric motor generating vehicle driving force.

BACKGROUND ART

A hybrid vehicle has received attention as an environmentally friendly vehicle. In addition to a conventional internal combustion engine, the hybrid vehicle is equipped with a power storage device, an inverter and an electric motor driven by the inverter, as power sources for the vehicle to run. Among hybrid vehicles, a so-called plug-in hybrid vehicle allowing charging of a power storage device built in the vehicle from a power source outside the vehicle is recently attracting attention (hereinafter, the power source outside the vehicle is also referred to as an "external power source," and charging of the power storage device in the vehicle by the external power source is also referred to as "external charging").

Japanese Patent Laying-Open No. 2008-201262 (PTL 1) discloses a plug-in hybrid vehicle that can prevent degradation of a power storage unit in accordance with the manner of use by the user. In the hybrid vehicle, non-external charging time Tcum representing the elapsed time period from the most-recent external charging (last external charging) is continuously accumulated. When ignition is on, a map is looked up, an SOC control central value corresponding to the non-external charging time Tcum at that time point is obtained, and based on the thus obtained SOC control central value, charge/discharge of the charge storage unit is managed. If the non-external charge time Tcum exceeds a prescribed threshold value Ta, the SOC control central value increases until it reaches a control central value SOCC (N).

According to this literature, by such an arrangement, it becomes possible to prevent degradation of the charge storage unit in accordance with the style of use by the user (see PTL 1).

CITATION LIST

Patent Literature

PTL 1: Japanese Patent Laying-Open No. 2008-201262

SUMMARY OF INVENTION

Technical Problem

For a hybrid vehicle, running with the international combustion engine stopped as much as possible is desired. Such demand is particularly strong for a plug-in hybrid vehicle (in the following, running using only the electric motor with internal combustion engine stopped will be referred to as "EV (Electric Vehicle) running" and in contrast, running with the operation of internal combustion engine will be referred to as "HV (Hybrid Vehicle) running").

It is possible to switch the running mode from one in which EV miming is given priority (in the following, referred to as "CD (Charge Depleting) mode") when state of charge (hereinafter denoted as "SOC (State of Charge)" and represented, for example, by a percentage to the maximum amount of charges in the power storage device) is higher than a prescribed value, to one in which SOC is maintained at a prescribed target by operating the internal combustion engine (hereinafter referred to as "CS (Charge Sustained) mode") when the SOC attains to the prescribed value.

It is advantageous if switching of running mode by the user is made possible, and by setting the SOC when the running mode is switched by the user from the CD mode to the CS mode as a control target, to maintain the SOC in a manner as desired by the user. Then, the running mode can be switched from the CS mode to the CD mode at a timing as desired by the user, and hence, it becomes possible to start EV running at a desired timing.

If the switching of running mode at an arbitrary timing by the user is made possible, however, degradation of the power storage device may be accelerated. Specifically, if the running mode should be switched by the user from the CD mode to the CS mode while SOC of the power storage device is high, control takes place while SOC is high and, therefore, there is a possibility of overcharge. Particularly, if the power storage device is a lithium ion secondary battery, precipitation of lithium caused by overcharge may pose a problem.

Further, even if the user wants EV running by maintaining SOC in the CS mode and then switching to the CD mode at a desired timing, stopping of the internal combustion engine is inhibited while the temperature of power storage device is low. Therefore, EV running as desired by the user cannot be realized.

The present invention was made to solve these problems and its object is to provide a hybrid vehicle in which the user may request switching of its running mode, and degradation of power storage device resulting from overcharge of the power storage device can be prevented.

Solution to Problem

According to an aspect, the present invention provides a hybrid vehicle, including: a rechargeable power storage device; an electric motor receiving electric power from the power storage device and generating vehicle driving force; an internal combustion engine; a controller; a detecting device; and a running mode switching request switch. The controller controls switching of running mode including a CD mode in which the internal combustion engine is stopped and running using the electric motor only is given priority, and a CS mode in which the internal combustion engine is operated to maintain state of charge of the power storage device at a prescribed target. The detecting device detects temperature of the power storage device. The running mode switching request switch is configured to allow a user to request switching of the running mode. When switching from the CD mode to the CS mode is requested by the running mode switching request switch, if SOC of the power storage device is larger than a specified value and the temperature of the power storage device is lower than a specified temperature, the controller maintains the CD mode as the running mode.

Preferably, a tolerable charging power (Win) representing electric power that can be input to the power storage device is more limited when SOC is larger than the specified value than when SOC is equal to or smaller than the specified value. The tolerable charging power is more limited when the temperature is lower than the specified temperature than when the temperature is equal to or higher than the specified temperature.

Preferably, when the running mode is switched from the first mode to the second mode in response to the request for switching from the first mode to the second mode by the running mode switching request switch, the controller sets the SOC when the running mode is switched as a target SOC.

Further, according to another aspect, the present invention provides a hybrid vehicle, including: a rechargeable power storage device; an electric motor receiving electric power from the power storage device and generating vehicle driving force; an internal combustion engine; a controller; a detecting device; and a running mode switching request switch. The controller controls switching of running mode including a CD mode in which the internal combustion engine is stopped and running using the electric motor only is given priority, and a CS mode in which the internal combustion engine is operated to maintain state of charge of the power storage device at a prescribed target. The detecting device detects temperature of the power storage device. The running mode switching request switch is configured to allow a user to request switching of the running mode. When switching from the CD mode to the CS mode is requested by the running mode switching request switch, if SOC of the power storage device is larger than a first specified value and the temperature of the power storage device is lower than a specified temperature, the controller switches the running mode from the CD mode to the CS mode and sets a second specified value smaller than the first specified value as a target of the SOC.

Preferably, when switching from the CD mode to the CS mode is requested by the running mode switching request switch, if a tolerable charging power (Win) representing electric power that can be input to the power storage device is smaller than a specified value, the controller maintains the CD mode as the running mode.

Preferably, when switching from the CD mode to the CS mode is requested by the running mode switching request switch, if the SOC is equal to or smaller than the first specified value, or if the temperature is equal to or higher than the specified temperature, the controller switches the running mode from the CD mode to the CS mode, and sets the SOC when the running mode is switched as a target SOC.

Preferably, the hybrid vehicle further includes a charger configured to receive electric power from a power source outside the vehicle and to charge the power storage device. The controller sets the running mode to the CD mode after the power storage device is charged by the charger.

Preferably, the power storage device is a lithium ion secondary battery.

Advantageous Effects of Invention

According to the present invention, a running mode switching request switch, allowing the user to request switching of the running mode, is provided. When switching from the CD mode to the CS mode is requested by the running mode switching request switch, the CD mode is maintained as the running mode, or the running mode is switched from the CD mode to the CS mode and the SOC target is set lower, if the SOC of power storage device is higher than a specified value and the temperature of power storage device is lower than the specified temperature. Therefore, SOC is not kept high. Accordingly, it is possible for the user to request switching of running mode, while the degradation of power storage device caused by overcharging of the power storage device can be prevented.

DESCRIPTION OF EMBODIMENTS

Figure 1:
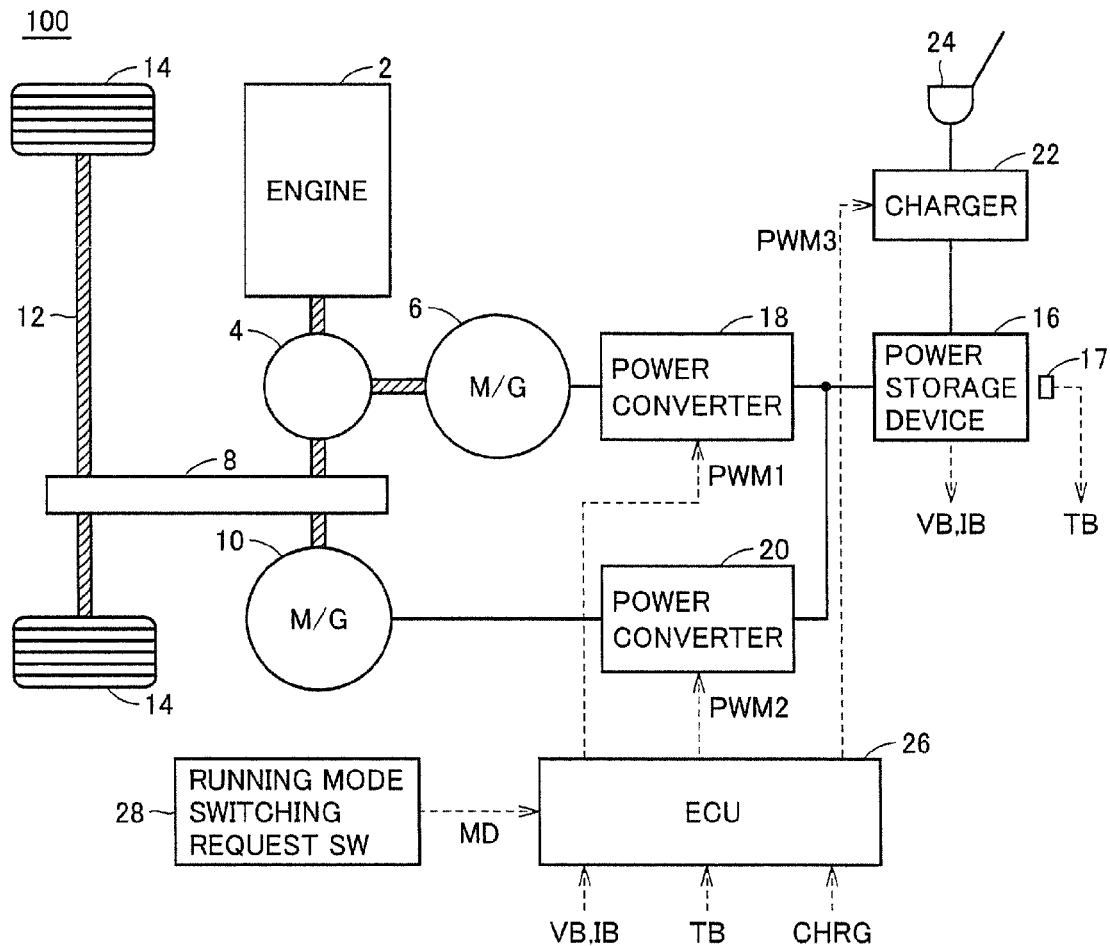
FIG. 1 is an overall block diagram of a hybrid vehicle in accordance with Embodiment 1 of the present invention.

In the following, embodiments of the present invention will be described in detail with reference to the figures. In the figures, the same or corresponding portions are denoted by the same reference characters and description thereof will not be repeated.

Embodiment 1

FIG. 1 is an overall block diagram of a hybrid vehicle according to Embodiment 1 of the present invention. With reference to FIG. 1, a hybrid vehicle 100 includes an engine 2, a power split device 4, motor generators 6, 10, a transmission gear 8, a drive shaft 12, and wheels 14. Hybrid vehicle 100 further includes a power storage device 16, power converters 18, 20, a charger 22, a charging inlet 24, an ECU (Electronic Control Unit) 26, and a running mode switching request switch 28.

Power split device 4 is coupled to engine 2, motor generator 6 and transmission gear 8 to distribute motive power among them. For example, a planetary gear having three rotation shafts of a sun gear, a planetary carrier and a ring gear can be used as power split device 4. These three rotation shafts are connected to the rotation shafts of engine 2, motor generator 6 and transmission gear 8, respectively. The rotation shaft of motor generator 10 is coupled to that of transmission gear 8. That is, motor generator 10 and transmission gear 8 share the same rotation shaft, which is connected to the ring gear of power split device 4.

Kinetic energy produced by engine 2 is distributed to motor generator 6 and transmission gear 8 by power split device 4. That is, engine 2 is incorporated into hybrid vehicle 100 as a power source that drives transmission gear 8 transmitting motive power to drive shaft 12 and drives motor generator 6. Motor generator 6 is incorporated into hybrid vehicle 100 to operate as a generator driven by engine 2 and as a motor capable of starting engine 2. Motor generator 10 is incorporated into hybrid vehicle 100 to operate as a power source that drives transmission gear 8 transmitting motive power to drive shaft 12.

Power storage device 16 is a chargeable and dischargeable DC power source, and is typically implemented by a lithium ion secondary battery. It may be a nickel-metal hydride or similar secondary battery. Power storage device 16 supplies electric power to power converters 18 and 20. Power storage device 16 is charged with electric power received from power converter(s) 18 and/or 20 during power generation of motor generator(s) 6 and/or 10. Further, power storage device 16 is charged with electric power received through charger 22 during charging from an external power source, not shown, connected to charging inlet 24.

Temperature sensor 17 detects a temperature TB of power storage device 16, and outputs the detected value to ECU 26. A voltage VB of power storage device 16 and a current IB input to power storage device 16 are also detected by sensors, not shown, and the detected values are applied to ECU 26.

Based on a signal PWM1 from ECU 26, power converter 18 converts electric power generated by motor generator 6 into DC power for output to power storage device 16. Based on a signal PWM2 from ECU 26, power converter 20 converts DC power supplied from power storage device 16 into AC power for output to motor generator 10. At the time of starting engine 2, based on signal PWM1, power converter 18 converts DC power supplied from power storage device 16 into AC power for output to motor generator 6. During braking of the vehicle, power converter 20, based on signal PWM2, converts electric power generated by motor generator 10 into DC power for output to power storage device 16.

Motor generators 6 and 10 are AC motors, and are each implemented by, for example, a three-phase synchronous motor with permanent magnets embedded in a rotor. Motor generator 6 converts kinetic energy produced by engine 2 into electric energy for output to power converter 18. Motor generator 6 generates driving force by three-phase AC power received from power converter 18 to start engine 2.

Motor generator 10 generates driving torque for the vehicle by three-phase AC power received from power converter 20. During braking of the vehicle, motor generator 10 converts mechanical energy stored in the vehicle as kinetic energy or potential energy into electric energy for output to power converter 20.

Engine 2 converts thermal energy produced by fuel combustion into kinetic energy for a movable member such as a piston or a rotor, and outputs the converted kinetic energy to power split device 4. For example, assuming that the movable member is a piston and is making a reciprocating motion, the reciprocating motion is converted into a rotational motion through a so-called crank mechanism, such that the kinetic energy of the piston is transmitted to power split device 4.

Based on a signal PWM3 from ECU 26, charger 22 converts electric power received through charging inlet 24 from the external power source into a voltage level at power storage device 16 for output to power storage device 16. Charging inlet 24 is an external charging interface through which electric power is supplied to power storage device 16 from the external power source.

ECU 26 generates signals PWM1 and PWM2 for driving power converters 18 and 20, respectively, and outputs generated signals PWM1 and PWM2 to power converters 18 and 20, respectively. Upon receipt of a signal CHRG requesting that power storage device 16 is charged through charger 22, ECU 26 generates signal PWM3 for driving charger 22, and outputs generated signal PWM3 to charger 22.

Further, ECU 26 controls switching of the running mode of hybrid vehicle 100. Specifically, ECU 26 controls switching between the CD mode in which EV running is given priority and the CS mode in which SOC of power storage device 16 is maintained at a prescribed target by operating engine 2.

In the CD mode, that the EV running is "given priority" means that basically the EV running takes place regardless of whether the SOC of power storage device 16 is maintained at the prescribed target or not. Specifically, if an accelerator pedal is pressed strongly by the driver, if an engine-driven type air conditioner is operated or if engine warm-up is being done, operation of engine 2 is allowed. In the CD mode in which SOC of power storage device 16 is not maintained, engine 2 is not operated unless it is necessary in view of driving force, and the vehicle basically travels with the charged power of power storage device 16 consumed by motor generator 10. During the CD mode, eventually, the ratio of discharge often becomes larger relative to charging.

The CS mode refers to a running mode in which engine 2 is operated to cause motor generator 6 to generate electric power in order to maintain the SOC of power storage device 16 at the prescribed target, and is not limited to running with engine 2 continuously operated.

After the end of external charging by charger 22, ECU 26 sets the running mode to CD mode, as a default setting.

Figure 2:
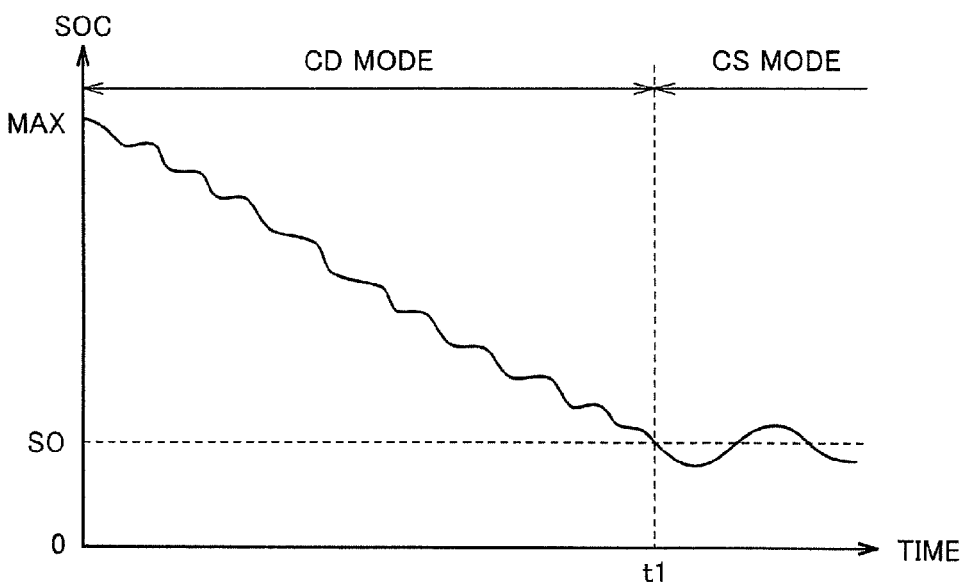
FIG. 2 shows a relation between the change in SOC of the power storage device and the running mode.

FIG. 2 shows a relation between the change in SOC of power storage device 16 and the running mode. In FIG. 2, it is assumed that there is no request to switch the running mode by running mode switching request switch 28, which will be described later.

Referring to FIG. 2, it is assumed that after power storage device 16 is fully charged by external charging (SOC=MAX), running starts. As described above, after the external charging, the running mode is set to the CD mode. During running in the CD mode, though SOC may temporarily increase due to the regenerative power recovered when, for example, the vehicle decelerates, basically, SOC decreases as the traveling distance increases. When SOC reaches the threshold value at time t1, the running mode is switched to the CS mode, and SOC is controlled such that it comes close to the threshold value SO.

Again referring to FIG. 1, ECU 26 further receives a signal MD from running mode switching request switch 28. The signal MD changes in accordance with the running mode (CD mode/CS mode) selected by running mode switching request switch 28. Determining that switching from the CD mode to the CS mode is requested by running mode switching request switch 28, ECU 26 controls switching of the running mode in accordance with the control structure, which will be described later, based on the SOC and the temperature of power storage device 16.

Running mode switching request switch 28 is an interface device for allowing the user to request switching of the running mode. Running mode switching request switch 28 allows the user to select the timing when EV running is to be done. Specifically, without such a switch, after the charging is complete and running starts, the running mode is always the CD mode and once SOC reaches the threshold value SO, the running mode is always the CS mode.

When you drive near your home late at night, or when you drive past an emission control region near the destination, it would be desirable to put off EV running in the CD mode. In such a case, it is possible during running in the CD mode to switch the running mode to the CS mode by running mode switching request switch 28 to ensure SOC, and in the area where EV running is desirable, to switch the running mode from the CS mode to the CD mode by running mode switching request switch 28, whereby EV running is possible in that area.

In response to the request to switch the running mode by the user, running mode switching request switch 28 changes the signal MD output to ECU 26. By way of example, if a request of switching from the CD mode to the CS mode is input by the user, running mode switching request switch 28 activates the signal MD, and if a request of switching from the CS mode to the CD mode is input, it inactivates the signal MD.

Figure 3:
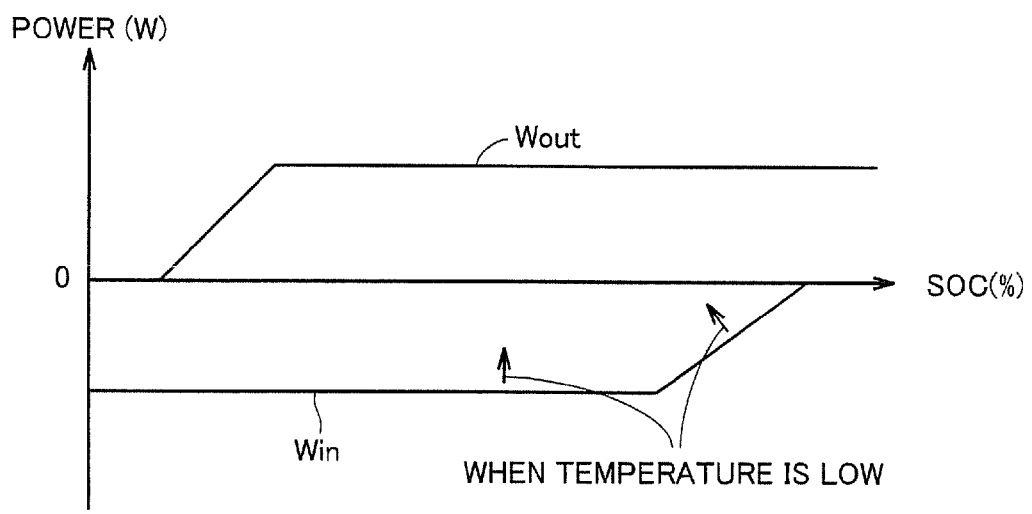
FIG. 3 shows tolerable charging power of the power storage device.

FIG. 3 shows the tolerable charging power Win of power storage device 16. Referring to FIG. 3, tolerable charging power Win represents the maximum value of the power (W) that can be input to power storage device 16. If SOC of power storage device 16 becomes high, the tolerable charging power 16 is limited, to prevent overcharge of power storage device 16. Further, if the temperature of power storage device 16 is low, internal resistance of power storage device 16 increases and hence voltage behavior becomes highly sensitive. Therefore, when the temperature of power storage device 16 is low, the tolerable charging power Win is limited to prevent excess voltage.

Specifically, when SOC of power storage device 16 is high and the temperature of power storage device 16 is low, the tolerable charging power Win is particularly limited. In such a situation, SOC of power storage device 16 cannot be regulated to be within a target range.

Particularly, when the temperature is low, the output of engine 2 becomes excessively higher than the target, since air density is high. As a result, the electric power generated by motor generator 6 using the output of engine 2 becomes excessive, and power storage device 16 is overcharged. Thus, the output of engine 2 is reduced. Then, when the output of engine 2 becomes lower than a threshold value of load operation of engine 2, operation mode of engine 2 enters self-sustained operation mode in which substantially no torque is output and, as a result, power storage device 16 cannot be charged and SOC lowers.

Further, if the temperature of power storage device 16 is low, stopping of engine 2 is inhibited. Therefore, even if the running mode is switched from the CD mode to the CS mode by running mode switching request switch 28 to maintain SOC and then the running mode is switched from the CS mode to the CD mode at a desired timing, after all, EV running is not possible.

Therefore, in Embodiment 1, when switching from the CD mode to the CS mode is requested by running mode switching request switch 28, switching from the CD mode to the CS mode is not permitted but the CD mode is maintained as the running mode, if the SOC of power storage device 16 is high and the temperature of power storage device 16 is low.

In FIG. 3, tolerable discharge power Wout represents the maximum value of power (W) that can be output from power storage device 16.

Figure 4:
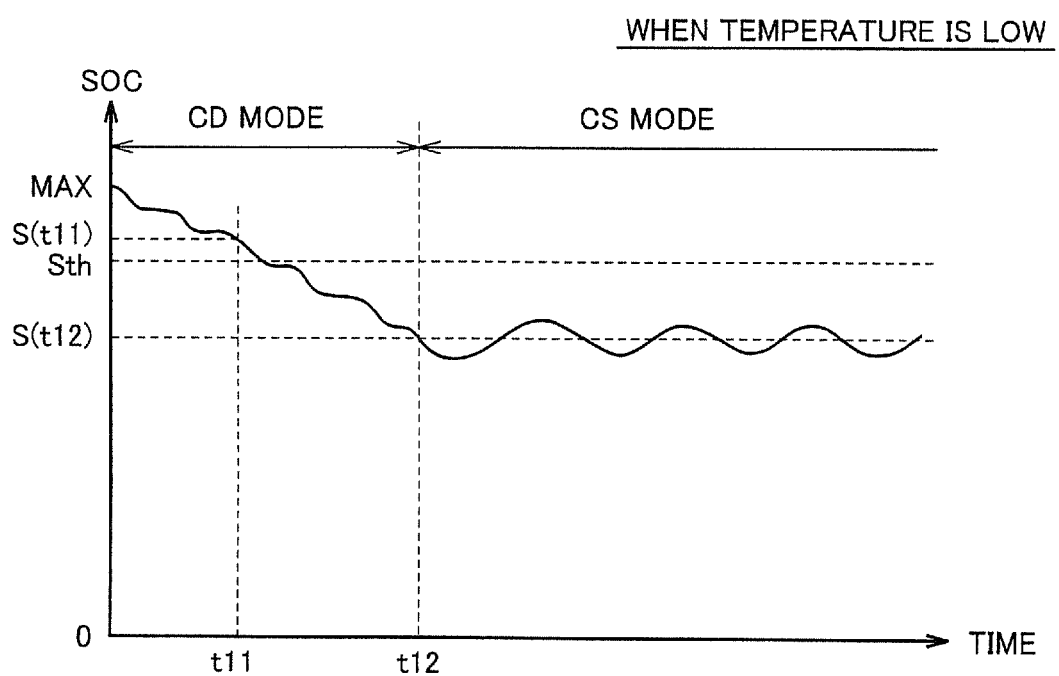
FIG. 4 shows an example of how the running mode is switched, in Embodiment 1.

FIG. 4 shows an example of how the running mode is switched, in Embodiment 1. It is assumed that the temperature TB of power storage device 16 is lower than a prescribed threshold value, indicating that the temperature TB is low enough to cause limitation of tolerable charging power Win.

Referring to FIG. 4, it is assumed that power storage device 16 is fully charged (SOC=MAX) by external charging and then running starts. As described above, after external charging, the running mode is set to the CD mode. Assume that at time t11, switching from the CD mode to the CS mode is requested by running mode switching request switch 28. However, S(t11) representing SOC of power storage device 16 at this time point is higher than a predetermined threshold value Sth and the temperature TB of power storage device 16 is lower than the threshold value. Therefore, the switching request at time t11 is denied, and the CD mode is kept as the running mode.

Assume that switching from the CD mode to the CS mode is again requested by running mode switching request switch 28 at time t12. Here, S(t12) representing SOC at this time point is lower than the threshold value Sth and, therefore, the running mode switching request at time t12 is accepted. Therefore, the running mode is switched from the CD mode to the CS mode. SOC is regulated to be close to the value S(t12) when the running mode is switched.

Figure 5:
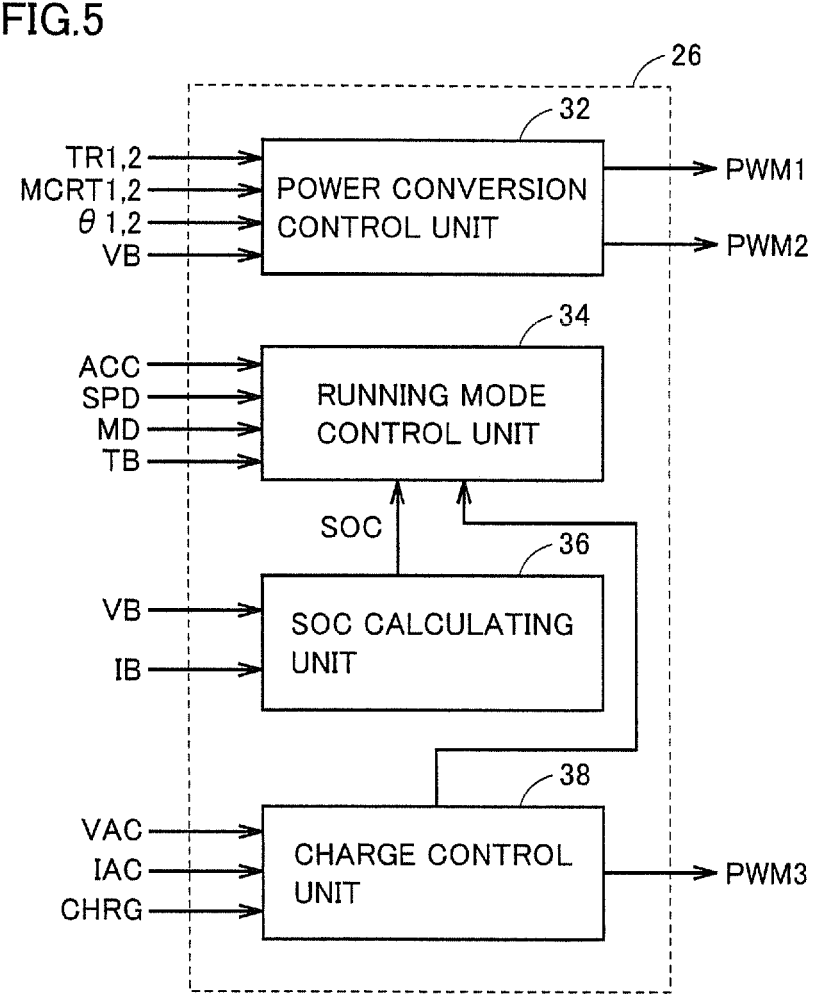
FIG. 5 is a functional block diagram of ECU shown in FIG. 1.

FIG. 5 is a functional block diagram of ECU 26 shown in FIG. 1. With reference to FIG. 5, ECU 26 includes a power conversion control unit 32, a running mode control unit 34, an SOC calculation unit 36, and a charge control unit 38. Power conversion control unit 32 generates signals PWM1 and PWM2 for driving motor generators 6 and 10, respectively, based on torque command values TR1, TR2, motor currents MCRT1, MCRT2 and rotor rotation positions θ1, θ2 of motor generators 6, 10, and voltage VB at power storage device 16, and outputs generated signals PWM1 and PWM2 to power converters 18 and 20, respectively.

Torque command values TR1 and TR2 are calculated by a torque calculation unit not shown based on an accelerator pedal position, vehicle speed and the like. Each of motor currents MCRT1, MCRT2, rotor rotation positions θ1, θ2, and voltage VB is detected by a sensor not shown.

Running mode control unit 34 controls the change in the running mode based on signal MD from running mode switching request switch 28, the temperature TB of power storage device 16 detected by temperature sensor 17 and a signal SOC from SOC calculation unit 36 indicative of the SOC of power storage device 16. Specifically, running mode control unit 34 determines whether or not switching from the CD mode to the CS mode is requested by running mode switching request switch 28 based on the signal MD, and if it is determined that switching from the CD mode to the CS mode is requested, it controls switching of running mode in accordance with the process procedure as will be described later.

Further, running mode control unit 34 forces the running mode to the CS mode when the SOC of power storage device 16 attains to the threshold value S0 (FIG. 2), even if there is no request for switching the running mode from the CD mode to the CS mode by running mode switching request switch 28. When a notice that external charging by charger 22 is completed is received from charge control unit 38, running mode control unit 34 sets the running mode to the CD mode.

Running mode control unit 34 then determines whether or not engine 2 is to be operated based on an accelerator-pedal-position signal ACC indicative of an accelerator pedal position, a vehicle speed signal SPD indicative of a vehicle speed, the selected running mode, and signal SOC. Specifically, running mode control unit 34 calculates power required for driving the vehicle based on accelerator-pedal-position signal ACC and vehicle speed signal SPD, and calculates a charge/discharge demand amount for power storage device 16 based on the SOC of power storage device 16 using a charge/discharge map specified beforehand. In the CD mode, the charge demand amount is zero. Running mode control unit 34 then adds the charge/discharge demand amount to the power required for driving to obtain an engine output demand value, and determines whether or not engine 2 is to be operated based on whether or not the obtained engine output demand value exceeds a prescribed threshold value.

If it is determined that engine 2 is to be operated in accordance with the above-described determination of operation of engine 2, running mode control unit 34 starts engine 2. If it is determined that engine 2 is to be shut down in accordance with the above-described determination of operation, running mode control unit 34 shuts down engine 2.

SOC calculation unit 36 calculates the SOC of power storage device 16 based on the respective detected values of current IB and voltage VB at power storage device 16, and outputs signal SOC indicative of the calculated SOC to running mode control unit 34. Calculation of the SOC can be performed with any of various publicly-known techniques.

If signal CHRG requesting charging of power storage device 16 through charger 22 is activated, charge control unit 38 generates signal PWM3 for driving charger 22 based on respective detected values of a voltage VAC and a current IAC of electric power fed through charging inlet 24, and outputs signal. PWM3 to charger 22. Voltage VAC and current IAC are detected by sensors not shown, respectively. Further, when external charging by charger 22 is completed, charge control unit 38 notifies running mode control unit 34 about the completion.

Figure 6:
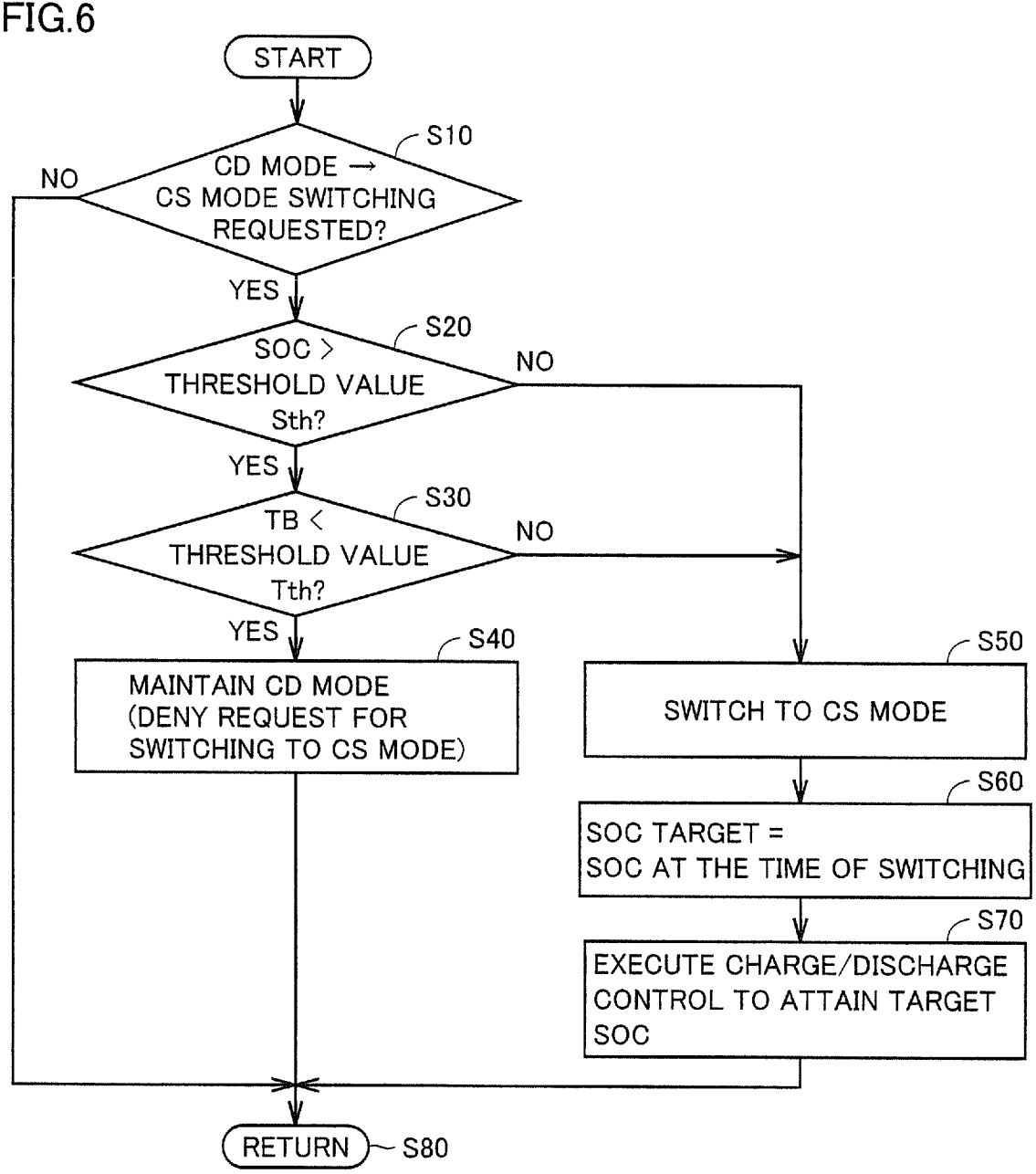
FIG. 6 is a flowchart representing process procedure of the ECU when switching from the CD mode to the CS mode is requested by the running mode switching request switch.

FIG. 6 is a flowchart representing process procedure of ECU 26 when switching from the CD mode to the CS mode is requested by running mode switching request switch 28. Referring to FIG. 6, ECU 26 determines whether or not switching from the CD mode to the CS mode is requested, based on the signal MD received from running mode switching request switch 28 (step S10).

If it is determined at step S10 that the switching is requested (YES at step S10), ECU 26 determines whether or not SOC of power storage device 16 is higher than the threshold value Sth (FIG. 4) (step S20). If SOC is determined to be higher than the threshold value Sth (YES at step S10), ECU 26 further determines whether or not the temperature TB of power storage device 16 is lower than the threshold value Tth representing that the temperature of power storage device 16 is low enough to limit the tolerable charging power Win (step S30).

Then, if the temperature TB is determined to be lower than the threshold value Tth at step S30 (YES at step S30), ECU 26 denies the request of switching from the CD mode to the CS mode by running mode switching request switch 28, and maintains the CD mode as the running mode (step S40).

On the other hand, if the SOC is determined to be equal to or lower than the threshold value Sth at step S20 (NO at step S20) or if the temperature TB is determined to be equal to or higher than the threshold value Tth at step S30 (NO at step S30), ECU 26 switches the running mode from the CD mode to the CS mode (step S50). ECU 26 sets the SOC at the time of switching of running mode as a target SOC (step S60), and executes charge/discharge control of power storage device 16 to realize the set target SOC (step S70).

As described above, in Embodiment 1, when switching from the CD mode to the CS mode is requested by running mode switching request switch 28, the CD mode is maintained as the running mode if the SOC of power storage device 16 is higher than the threshold value Sth and the temperature TB of power storage device 16 is lower than the threshold value Tth. Therefore, high SOC state does not last long. Therefore, according to Embodiment 1, it is possible for the user to request switching of running mode, and it is possible to prevent degradation of power storage device 16 caused by overcharging of power storage device 16.

Embodiment 2

When switching from the CD mode to the CS mode is requested by running mode switching request switch 28, in Embodiment 1, the request of switching from the CD mode to the CS mode is denied and the CD mode is maintained as the running mode, if the SOC of power storage device 16 is higher than the threshold value Sth and the temperature TB of power storage device 16 is lower than the threshold value Tth. In Embodiment 2, when the above-described conditions are satisfied, the running mode is switched as requested, while the target SOC in the CS mode is made lower, in order to prevent the SOC from staying at high level.

Figure 7:
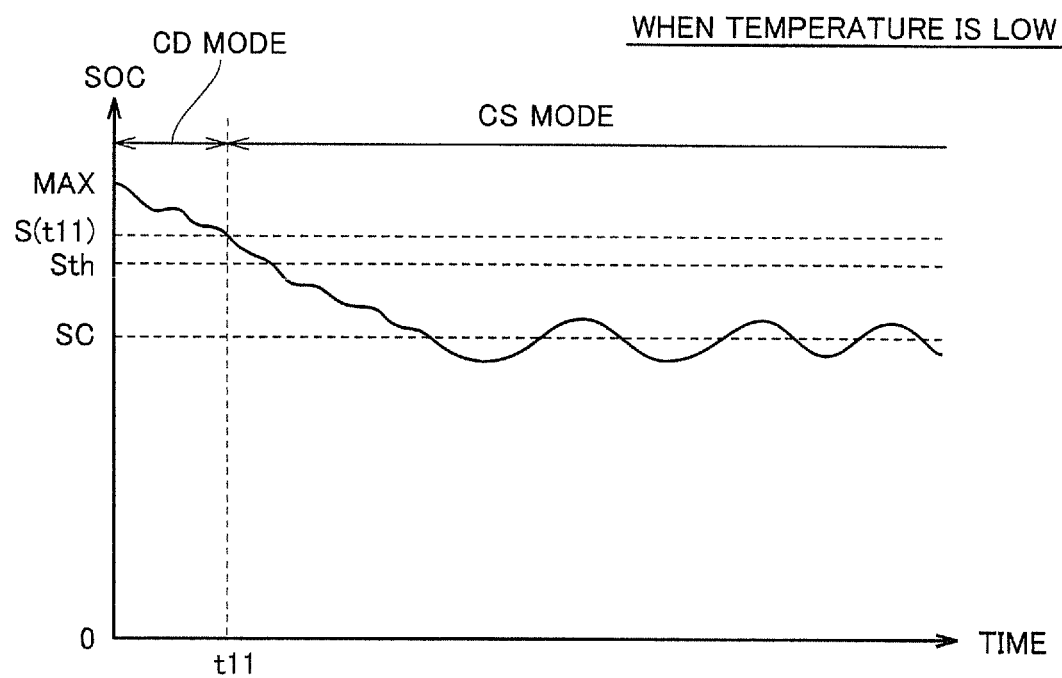
FIG. 7 shows an example of how the running mode is switched, in Embodiment 2.

FIG. 7 shows an example of how the running mode is switched, in Embodiment 2. FIG. 7 corresponds to FIG. 4 described with reference to Embodiment 1, and in FIG. 7 also, it is assumed that the temperature TB of power storage device 16 is lower than the prescribed threshold value indicating that the temperature TB is low enough to limit the tolerable charging power Win.

Referring to FIG. 7, as in the example shown in FIG. 4, assume that at time t11, switching from the CD mode to the CS mode is requested by running mode switching request switch 28. Here, S(t11) representing SOC of power storage device 16 at this time point is higher than the threshold value Sth and the temperature TB of power storage device 16 is lower than the threshold value, and hence, the running mode is switched from the CD mode to the CS mode and the target SOC is decreased to a value SC lower than the threshold value Sth.

The overall configuration of the hybrid vehicle in accordance with Embodiment 2 is the same as that of hybrid vehicle 100 in accordance with Embodiment 1 shown in FIG. 1.

Figure 8:
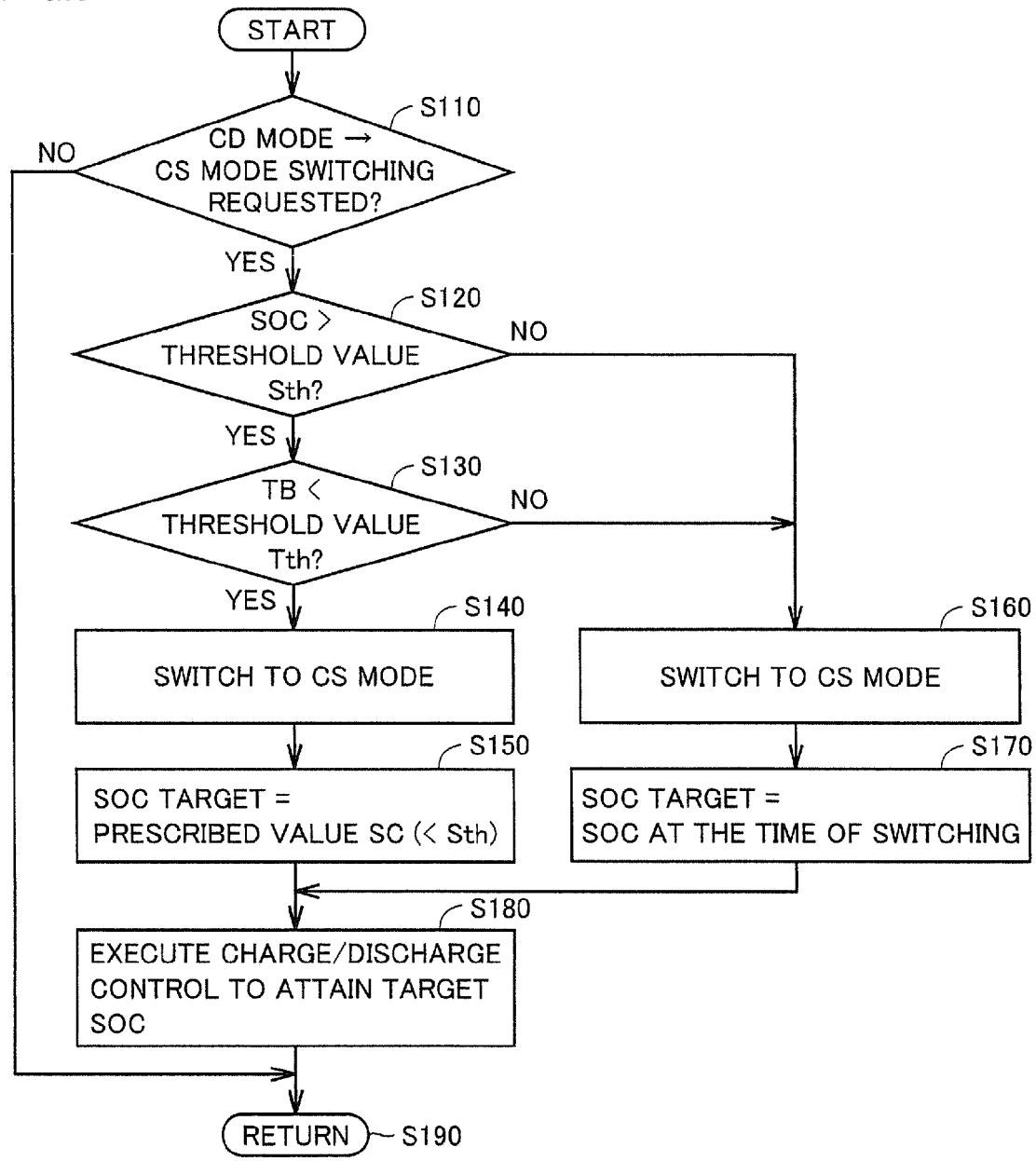
FIG. 8 is a flowchart representing process procedure of the ECU when switching from the CD mode to the CS mode is requested by the running mode switching request switch, in accordance with Embodiment 2.

FIG. 8 is a flowchart representing process procedure of ECU 26 when switching from the CD mode to the CS mode is requested by running mode switching request switch 28, in accordance with Embodiment 2. Referring to FIG. 8, the process of steps S110 to S130 is the same as that of steps S10 to S30 shown in FIG. 6 and, therefore, description thereof will not be repeated.

At step S130, if the temperature TB of power storage device 16 is determined to be lower than the threshold value Tth (YES at step S130), ECU 26 switches the running mode from the CD mode to the CS mode (step S140). Then, ECU 26 sets a predetermined value SC (FIG. 7) lower than the threshold value Sth1 to be a target SOC (step S150), and executes charge/discharge control of power storage device 160 to realize the set target SOC (step S180).

On the other hand, if SOC is determined to be equal to or lower than the threshold value Sth at step S120 (NO at step S120) or if the temperature TB is determined to be equal to or higher than the threshold value Tth at step S130 (NO at step S130), ECU 26 switches the running mode from the CD mode to the CS mode (step S160). Then, ECU 26 sets the SOC at the time of switching of the running mode as the target SOC (step S170), and the control proceeds to step S180.

As described above, in Embodiment 2, when switching from the CD mode to the CS mode is requested by running mode switching request switch 28, if the SOC of power storage device 16 is higher than the threshold value Sth and the temperature TB of power storage device 16 is lower than the threshold value Tth, the running mode is switched from the CD mode to the CS mode and the target SOC is made lower. Thus, the SOC is not kept high. Therefore, according to Embodiment 2 also, it is possible for the user to request switching of the running mode and it is possible to prevent degradation of power storage device 16 caused by overcharging of power storage device 16.

[Modification]

In this modification, in the process for switching the running mode when switching from the CD mode to the CS mode is requested by running mode switching request switch 28, the tolerable charging power Win of power storage device 16 is added as another condition. If the tolerable charging power Win is smaller than a specified value, CD mode is maintained as the running mode, as in Embodiment 1. On the other hand, if the tolerable charging power Win is equal to or larger than the specified value, the running mode is switched from the CD mode to the CS mode and the target SOC is decreased to a value lower than the threshold value Sth, as described in Embodiment 2.

Figure 9:
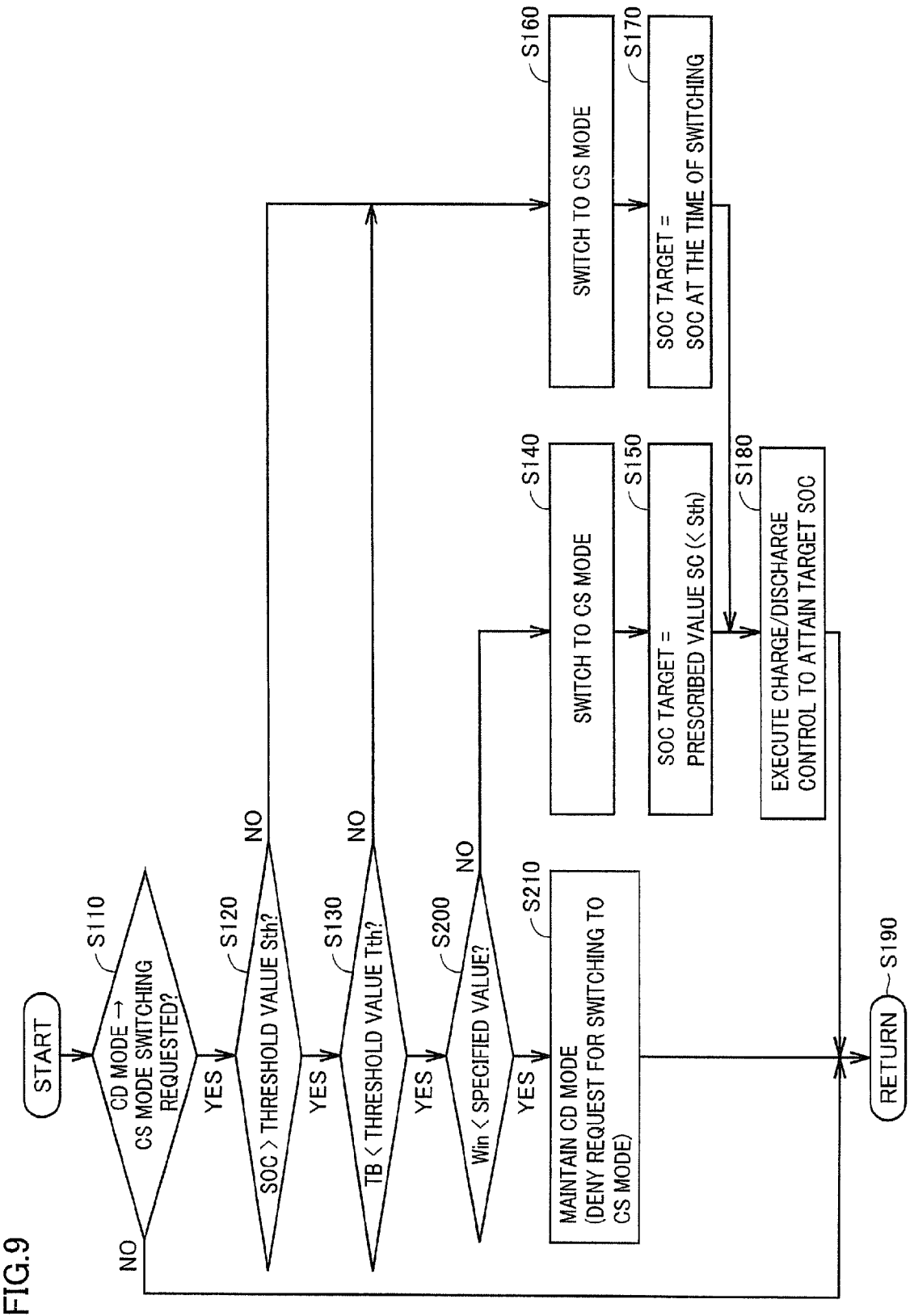
FIG. 9 is a flowchart representing process procedure of the ECU when switching from the CD mode to the CS mode is requested by the running mode switching request switch, in accordance with a modification.

FIG. 9 is a flowchart representing process procedure of ECU 26 when switching from the CD mode to the CS mode is requested by running mode switching request switch 28, in accordance with the modification. Referring to FIG. 9, the flowchart corresponds to the flowchart of Embodiment 2 shown in FIG. 8, and it additionally includes steps S200 and S210.

Specifically, at step S130, if the temperature TB of power storage device 16 is determined to be lower than the threshold value Tth at step S130 (YES at step S130), ECU 26 determines whether or not the tolerable charging power Win is smaller than the specified value (step S200). As described with reference to FIG. 3, the tolerable charging power Win changes dependent on the SOC and temperature TB of power storage device 16.

Then, if the tolerable charging power Win is determined to be smaller than the specified value at step S200 (YES at step 200), ECU 26 denies the request for switching from the CD mode to the CS mode by running mode switching request switch 28, and maintains the CD mode as the running mode (step S210). On the other hand, if the tolerable charging power Win is determined to be equal to or larger than the specified value (NO at step 200), the process proceeds to step S140, at which the running mode is switched from the CD mode to the CS mode. The contents of steps S110 to S190 are the same as described with reference to FIG. 8.

As described above, according to the modification also, it is possible for the user to request switching of the running mode and it is possible to prevent degradation of power storage device 16 caused by overcharging of power storage device 16.

Though a plug-in hybrid vehicle has been described in which power storage device 16 can be charged from an external power source using charger 22 in the embodiments above, application of the present invention is not specifically limited to the plug-in hybrid vehicle.

Further, in the embodiments above, it is assumed that power storage device 16 is charged by an external power source using dedicated charger 22. The method of charging power storage device 16 by an external power source is not limited to the above. By way of example, a power line pair connected to charge inlet 24 may be connected to neutral points of motor generators 6 and 10, and by converting electric power from an external power source applied to the neutral points of motor generators 6 and 10 by power converters 18 and 20, power storage device 16 may be charged.

In the embodiments above, a series/parallel type hybrid vehicle in which the power of engine 2 can be divided by power split device 4 and transmitted to the transmission gear and motor generator 6 has been described. The present invention, however, is applicable to hybrid vehicles of other types. Specifically, the present invention is applicable to a so-called series type hybrid vehicle in which engine 2 is used only for driving motor generator 6 and vehicle driving power is generated only by motor generator 10, a hybrid vehicle in which, of the kinetic energy generated by engine 2, only the regenerative energy is recovered as electric energy, and a motor-assisted type hybrid vehicle in which the engine is used as a main power, assisted by a motor as needed.

In the foregoing, motor generator 10 corresponds to an embodiment of "electric motor" of the present invention, and engine 2 corresponds to an embodiment of "internal combustion engine" of the present invention. Further, ECU 26 corresponds to an embodiment of "controller" of the present invention, and temperature sensor 17 corresponds to an embodiment of "detecting device" of the present invention. Further, charger 22 corresponds to an embodiment of "charger" of the present invention.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

REFERENCE SIGNS LIST

2 engine, 4 power split device, 6, 10 motor generator, 8 transmission gear, 12 drive shaft, 14 wheels, 16 power storage device, 17 temperature sensor, 18, 20 power converter, 22 charger, 24 charging inlet, 26 ECU, 28 running mode switching request switch, 32 power conversion control unit, 34 running mode control unit, 36 SOC calculating unit, 38 charge control unit, 100 hybrid vehicle.

The invention claimed is:

1. A hybrid vehicle, comprising:
   a rechargeable power storage device;
   an electric motor receiving electric power from said power storage device and generating vehicle driving force;
   an internal combustion engine;
   a controller controlling switching of running mode including a first mode in which said internal combustion engine is stopped and running using said electric motor only is given priority, and a second mode in which said internal combustion engine is operated to maintain state of charge of said power storage device at a prescribed target;
   a detecting device for detecting temperature of said power storage device; and
   a running mode switching request switch configured to allow a user to request switching of said running mode; wherein
   when switching from said first mode to said second mode is requested by said running mode switching request switch, if a state quantity representing said state of charge is larger than a specified value and the temperature of said power storage device is lower than a specified temperature, said controller maintains said first running mode as said running mode.

2. The hybrid vehicle according to claim 1, wherein
   a tolerable charging power representing electric power that can be input to said power storage device is more limited when said state quantity is larger than said specified value than when said state quantity is equal to or smaller than said specified value; and
   said tolerable charging power is more limited when said temperature is lower than said specified temperature than when said temperature is equal to or higher than said specified temperature.

3. The hybrid vehicle according to claim 1, wherein
   when said running mode is switched from said first mode to said second mode in response to the request for switching from said first mode to said second mode by said running mode switching request switch, said controller sets said state quantity when said running mode is switched as a target of said state of charge.

4. A hybrid vehicle, comprising:
   a rechargeable power storage device;
   an electric motor receiving electric power from said power storage device and generating vehicle driving force;

an internal combustion engine;

a controller controlling switching of running mode including a first mode in which said internal combustion engine is stopped and running using said electric motor only is given priority, and a second mode in which said internal combustion engine is operated to maintain state of charge of said power storage device at a prescribed target;

a detecting device for detecting temperature of said power storage device; and a running mode switching request switch configured to allow a user to request switching of said running mode; wherein when switching from said first mode to said second mode is requested by said running mode switching request switch, if a state quantity representing said state of charge is larger than a first specified value and the temperature of said power storage device is lower than a specified temperature, said controller switches said running mode from said first mode to said second mode and sets a second specified value smaller than said first specified value as a target of said state of charge.

5. The hybrid vehicle according to claim 4, wherein when switching from said first mode to said second mode is requested by said running mode switching request switch, if a tolerable charging power representing electric power that can be input to said power storage device is smaller than a specified value, said controller maintains said first running mode as said running mode.

6. The hybrid vehicle according to claim 4, wherein when switching from said first mode to said second mode is requested by said running mode switching request switch, if said state quantity is equal to or smaller than said first specified value, or if said temperature is equal to or higher than said specified temperature, said controller switches said running mode from said first mode to said second mode, and sets said state quantity when said running mode is switched as a target of said state of charge.

7. The hybrid vehicle according to claim 1, further comprising
a charger configured to receive electric power from a power source outside the vehicle and to charge said power storage device; wherein
said controller sets said running mode to said first mode after said power storage device is charged by said charger.

8. The hybrid vehicle according to claim 1, wherein said power storage device is a lithium ion secondary battery.

9. The hybrid vehicle according to claim 2, wherein when said running mode is switched from said first mode to said second mode in response to the request for switching from said first mode to said second mode by said running mode switching request switch, said controller sets said state quantity when said running mode is switched as a target of said state of charge.

10. The hybrid vehicle according to claim 5, wherein when switching from said first mode to said second mode is requested by said running mode switching request switch, if said state quantity is equal to or smaller than said first specified value, or if said temperature is equal to or higher than said specified temperature, said controller switches said running mode from said first mode to said second mode, and sets said state quantity when said running mode is switched as a target of said state of charge.

11. The hybrid vehicle according to claim 2, further comprising
a charger configured to receive electric power from a power source outside the vehicle and to charge said power storage device; wherein
said controller sets said running mode to said first mode after said power storage device is charged by said charger.

12. The hybrid vehicle according to claim 4, further comprising
a charger configured to receive electric power from a power source outside the vehicle and to charge said power storage device; wherein
said controller sets said running mode to said first mode after said power storage device is charged by said charger.

13. The hybrid vehicle according to claim 5, further comprising
a charger configured to receive electric power from a power source outside the vehicle and to charge said power storage device; wherein
said controller sets said running mode to said first mode after said power storage device is charged by said charger.

14. The hybrid vehicle according to claim 2, wherein said power storage device is a lithium ion secondary battery.

15. The hybrid vehicle according to claim 4, wherein said power storage device is a lithium ion secondary battery.

16. The hybrid vehicle according to acclaim 5, wherein said power storage device is a lithium ion secondary battery.

* * * * *